UNITED STATES PATENT OFFICE.

ARTHUR J. BALDWIN, OF EAST ORANGE, NEW JERSEY, AND JAMES F. LESTER, OF NEW YORK, N. Y.

PROCESS OF STERILIZING.

No. 920,811.     Specification of Letters Patent.     Patented May 4, 1909.

Application filed February 16, 1909. Serial No. 478,321.

*To all whom it may concern:*

Be it known that we, ARTHUR J. BALDWIN and JAMES F. LESTER, both citizens of the United States, residing at East Orange, county of Essex, and State of New Jersey, and New York, county and State of New York, respectively, have invented certain new and useful Improvements in Processes of Sterilizing, of which the following is a full, clear, and exact description.

The discovery which forms the subject of our present application is a new and highly effective process of sterilization, primarily intended for the treatment of milk, but applicable to many other fluids and solids in which, either for purposes of preservation, or as a sanitary precaution for immediate use and consumption, or other like purposes, it is desirable to destroy or inhibit the growth or development of deleterious germs and living organisms.

In practicing our process we subject the substance to be sterilized or preserved to a pressure that will be exerted upon its individual molecules, by applying a gaseous pressure much above the normal, and then relieving such pressure, and the process may be practiced by any known means or appliances which are capable of effecting these operations.

In practically carrying out this process for securing, to the fullest extent, the results in view, we have proceeded as follows: We take, say, a quantity of milk, which may show upon bacteriological analysis the presence of many thousands of bacteria to the cubic centimeter, and subject it in a suitable chamber or receptacle to an air or gaseous pressure of from one hundred to two hundred pounds to the square inch, and maintain the pressure for a period of an hour or more, and then reduce or relieve the pressure to that of the atmosphere. After such treatment the milk has been found upon analysis to be practically and even entirely free from bacteria or living organisms of any kind, or, in other words, to have been sterilized.

By the application of this process, not only fluids, but solids and semi-solids of animal and vegetable matter may be freed from living organisms and sterilized. In order to be sure of this result, we prefer to apply an air or gaseous pressure of approximately two hundred pounds and to maintain such pressure for several hours, but as the invention involves essentially the application of a pressure which, in its effect, is destructive of bacteria or inhibitive of their growth or development, it is manifest that it is not limited to the period of time nor to the use of the exact pressure above named. We have found, for example, that the application of pressures from sixty pounds up to three hundred, for periods varying from half an hour in the case of milk up to several weeks in the case of other substances, is not only effective to destroy such bacteria as the substance may contain when subjected to the treatment, but inhibits the growth or development of any living organisms therein, as long as the pressure is maintained.

What we claim as our discovery is:

1. The process of sterilizing substances containing bacteria, which consists in subjecting such substances to pressure of a gas.

2. The process of sterilizing substances of the kind described and preventing the growth or development of bacteria therein, which consists in subjecting such substances to a sustained gaseous pressure.

3. The process of sterilizing substances containing bacteria, which consists in subjecting such substances to air pressure.

4. The process of sterilizing substances of the kind described, and preventing the growth or development of bacteria therein, which consists in subjecting such substances to a sustained air pressure.

5. The process of sterilizing substances containing bacteria, which consists in subjecting such substances to pressure of a gas, and then withdrawing or relieving such pressure.

6. The process of sterilizing substances containing bacteria, which consists in subjecting such substances to air pressure, and then withdrawing or relieving such pressure.

7. The process of sterilizing substances of the kind described, which consists in subjecting the same to a sustained gaseous pressure destructive of living organisms and then withdrawing or relieving such pressure.

8. The process of sterilizing milk and preventing the growth or development of bacteria therein, which consists in subjecting the same to a sustained gaseous pressure.

In testimony whereof we affix our signatures in the presence of two subscribing witnesses.

ARTHUR J. BALDWIN.
JAMES F. LESTER.

Witnesses:
 EDWARD T. MAGOFFIN,
 PHILIP S. HILL.